(12) United States Patent
Ideguchi et al.

(10) Patent No.: US 10,177,918 B2
(45) Date of Patent: Jan. 8, 2019

(54) USER PERMISSION CHECK SYSTEM

(71) Applicant: HITACHI, LTD., Tokyo (JP)

(72) Inventors: Kota Ideguchi, Tokyo (JP); Eriko Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 123 days.

(21) Appl. No.: 15/404,679

(22) Filed: Jan. 12, 2017

(65) Prior Publication Data

US 2017/0222810 A1 Aug. 3, 2017

(30) Foreign Application Priority Data

Feb. 1, 2016 (JP) ................................. 2016-016836

(51) Int. Cl.
 H04L 9/32 (2006.01)
 H04L 9/14 (2006.01)
 H04L 29/06 (2006.01)
(52) U.S. Cl.
 CPC .............. *H04L 9/3242* (2013.01); *H04L 9/14* (2013.01); *H04L 9/321* (2013.01); *H04L 9/3234* (2013.01); *H04L 63/0428* (2013.01)
(58) Field of Classification Search
 CPC ......... H04L 9/14; H04L 9/321; H04L 9/3234; H04L 9/3242; H04L 63/0428; H04L 63/12; H04L 63/123
 See application file for complete search history.

(56) References Cited

U.S. PATENT DOCUMENTS

| | | | |
|---|---|---|---|
| 5,231,668 A | 7/1993 | Kravitz | |
| 6,915,426 B1* | 7/2005 | Carman | G06Q 20/3674 380/229 |
| 8,826,011 B2* | 9/2014 | Hahn | H04L 9/0822 380/270 |
| 2001/0039535 A1 | 11/2001 | Tsiounis et al. | |
| 2005/0129236 A1* | 6/2005 | Sharma | H04L 63/08 380/259 |

(Continued)

FOREIGN PATENT DOCUMENTS

WO 01/09701 A1 2/2001

OTHER PUBLICATIONS

Chan et al. "Efficient security primitives derived from a secure aggregation algorithm", Proceedings of the 15th ACM Conference on Computer and Communications Security, CCS '08. vol. 31, Oct. 27, 2008, p. 521.

(Continued)

*Primary Examiner* — Minh Dinh
(74) *Attorney, Agent, or Firm* — Volpe and Koenig, P.C.

(57) ABSTRACT

A user permission check system with less CPU throughput while ensuring non-repudiation is provided. In order to solve the above-described problem, in the present invention firstly, a MAC function that does not require a CPU to have high processing power is utilized. Additionally, a message is encrypted with a plurality of secret keys and the plurality of keys are distributed to a plurality of servers to make them have the keys in order to ensure validity of the message as a proof of non-repudiation. Subsequently, each server proves the validity of the message within its own range and the validity of the message is ensured by aggregating these individual results, thereby implementing the non-repudiation.

8 Claims, 12 Drawing Sheets

(56) References Cited

U.S. PATENT DOCUMENTS

| | | | |
|---|---|---|---|
| 2014/0230007 A1* | 8/2014 | Roth | G06F 21/6209 |
| | | | 726/1 |
| 2015/0100668 A1* | 4/2015 | Seo | H04L 63/123 |
| | | | 709/219 |
| 2015/0134969 A1 | 5/2015 | Kim et al. | |
| 2017/0031028 A1* | 2/2017 | Fernandez Hernandez | ............. |
| | | | H04L 9/3242 |
| 2017/0272251 A1* | 9/2017 | Osheter | H04L 9/3247 |

OTHER PUBLICATIONS

The Extended European Search Report dated Jun. 29, 2017 for the EP Application No. 17150377.4.

* cited by examiner

FIG.10

Message Telegram ~1500

| Header | Message | First MAC | Second MAC | ..... | N-th MAC |

ID
USER PERMISSION CHECK SYSTEM

TECHNICAL FIELD

The present invention relates to a technique regarding checking a user permission and prevention of repudiation of the user permission.

BACKGROUND ART

It is occasionally necessary to check a user permission in order to execute processing by, for example, an information system composed of client equipment and a server, or an automotive system composed of equipment mounted on an automobile and a server for communicating with such equipment. In these cases, the information system or the automotive system transmits a message to a user to ask for a permission and gets confirmation when the user returns a message of permission. Under this circumstance, the information system or the automotive system can keep a log of these exchanged messages in order to retrospectively explain that the permission has been obtained. However, if validity of the log is questioned, the information system or the automotive system needs to prove the validity of the log. In order to prove the validity, it is only necessary to show that the message of the user permission which is kept in the log was created certainly by the relevant user and has not been falsified. A property in which a creator of such message and its content cannot be denied retrospectively is called "non-repudiation." An electronic signature technique of public key cryptography technology disclosed in U.S. Pat. No. 5,231,668 is known as a technique that enables the non-repudiation. The technique in U.S. Pat. No. 5,231,668 can retrospectively prove that the relevant message was created certainly by the user, as the user assigns their signature by using their own signature key.

SUMMARY OF THE INVENTION

Problems to be Solved by the Invention

Regarding the method described in U.S. Pat. No. 5,231,668, it is necessary to process algorithms of the public key cryptography technology when generating the signature and when verifying the signature. However, the algorithm processing of the public key cryptography technology consumes more throughput and longer CPU time than those of algorithm processing of common key encryption technology. Particularly, in a case of a CPU with low specs which embedded devices such as on-board equipment, the CPU time becomes longer. Furthermore, if the CPU is occupied with for a long time, other processing cannot be executed. Thus, in a case of timely controlling particularly such as that on on-board equipments, the control can be influenced even on the order of several msec, so that the public key encryption system cannot sometimes be used due to safety issues.

Therefore, it is an object of the present invention to provide a user permission check system that operates with less CPU throughput and has the property of non-repudiation.

Means to Solve the Problems

In order to solve the above-described problem, in the present invention, firstly, a MAC function, in which high processing power is not requested regarding a CPU, is used. Additionally, in order to ensure validity of the message as a proof of the non-repudiation, a message is encrypted with a plurality of secret keys, and the plurality of keys are separately stored in a plurality of servers. Each server proves the validity of the message within its own range, and the validity of the message is ensured by aggregating these individual results, thereby the non-repudiation is realized.

Advantageous Effects of the Invention

As mentioned above, according to the present invention, it is possible to provide a user permission check system with less CPU throughput while ensuring non-repudiation.

BRIEF DESCRIPTION OF DRAWINGS

FIG. 10 is a schematic diagram illustrating the format of a message telegram.

DESCRIPTION OF EMBODIMENTS

When a user permitted operations with a user terminal and then retrospectively repudiates the permission, an embodiment will be described regarding a system capable of denying this repudiation.

Figure 1:
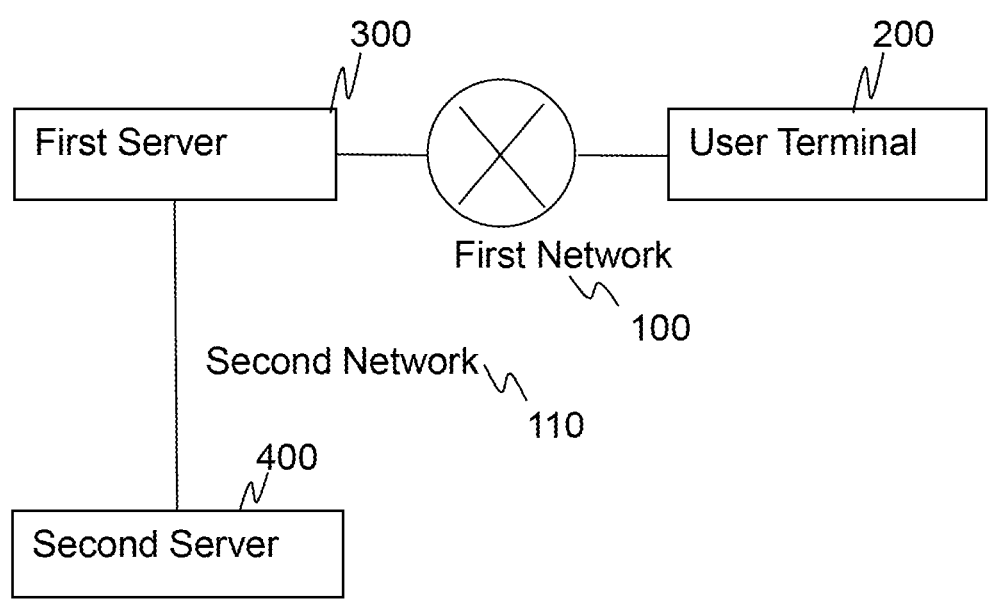
FIG. 1 is a diagram illustrating a system example of a first embodiment according to the present invention.

FIG. 1 is an overall configuration diagram of the system according to a first embodiment. In the first embodiment, a user terminal 200 and a first server 300 are connected each other via a first network 100. The first server and a second server 400 are connected each other via a second network 110. Note that it is not necessarily limited that the first network 100 and the second network 110 are separated, thus they may be unified together.

Figure 2:
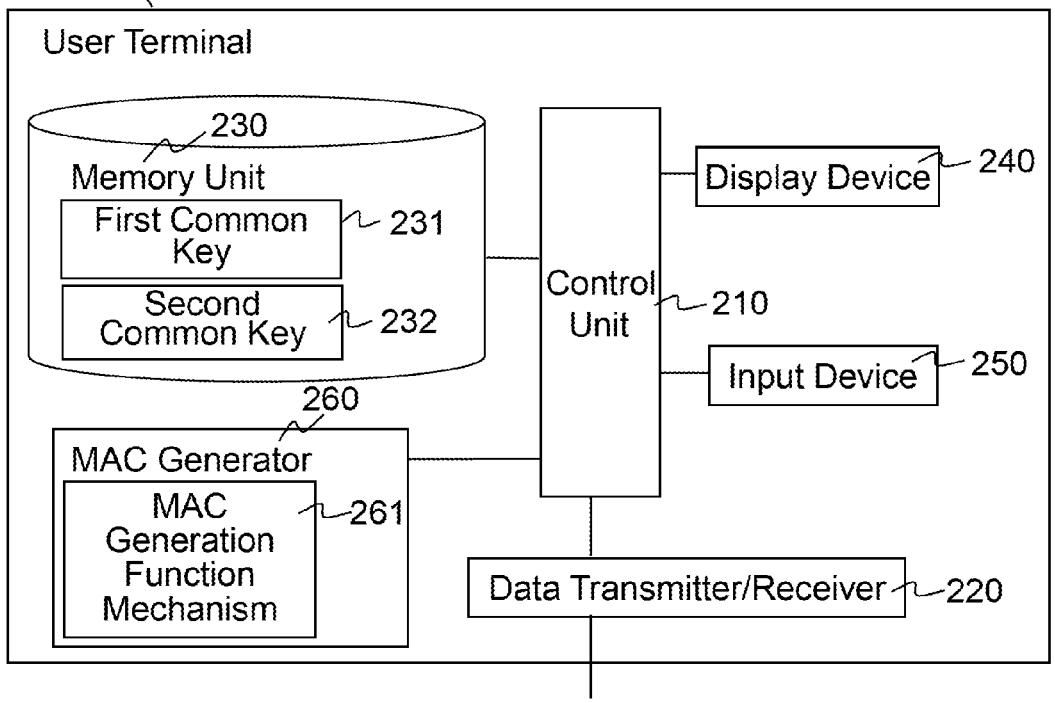
FIG. 2 is a schematic diagram illustrating a user terminal.

FIG. 2 is a schematic diagram of the user terminal 200 according to the present embodiment. As illustrated, the user terminal 200 comprises a control unit 210, a data transmitter/receiver 220, a memory unit 230, a display device 240, an input device 250, and a MAC generator 260.

The user terminal 200 is controlled by the control unit 210, and is linked to the first network 100 via the data transmitter/receiver 220.

The memory unit 230 can store data, and stores a first common key 231 and a second common key 232.

The MAC generator 260 comprises a MAC generation function mechanism 261.

The MAC generation function mechanism 261 is assigned with a message and a common key, and generates a corresponding message authentication code (MAC) by calculating a MAC generating function Genmac. Describing with a mathematical expression, the MAC generating function Genmac is represented by the following Mathematical Expression 1.

$$mac=Genmac(k,m)$$

However, k denotes the above-mentioned common key, m represents the above-mentioned message, and mac denotes the above-mentioned corresponding MAC, in the above expression.

A cryptographic MAC function is available as the above-mentioned MAC generating function Genmac. There are examples such as a MAC function configured in a CMAC usage mode of a block cipher AES, a MAC function configured in HMAC using a hash function SHA-256, and a dedicated MAC function Chaskey.

The MAC generator 260 generates a message telegram 500 with a MAC added thereto by receiving and processing a message, which is an object to add the MAC, a header, a first common key, and a second common key from the control unit 210.

Figure 5:
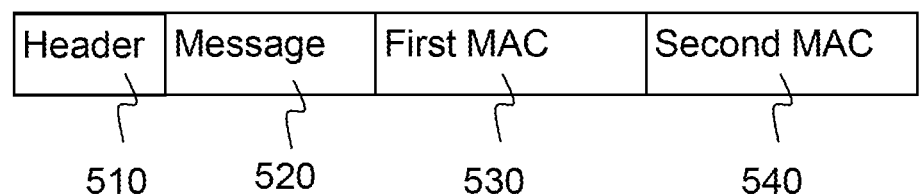
FIG. 5 is a schematic diagram illustrating the format of a message telegram.

FIG. 5 is a diagram illustrating a format 500 of a message telegram. As described in the explanation regarding the MAC generator, the message telegram is composed of a header 510, a message 520, a first MAC 530, and a second MAC 540. The header 510 is described with attribute information of the message telegram, for example, information such as the size of the message telegram and an ID of a common key used to generate the first MAC and the second MAC.

A processing sequence executed by the MAC generator 260 for generating the message telegram 500 will be described below. Note that in the following explanation, h denotes the above-mentioned header, m denotes the above-mentioned message, k_1 denotes the above-mentioned first common key, k_2 denotes the above-mentioned second common key, m_out denotes the above-mentioned message telegram, mac_1 denotes the first MAC, and mac_2 represents the second MAC.

Firstly, the MAC generator 260 delivers data obtained by coupling the above-mentioned header and the above-mentioned message together, and the first common key to the MAC generation function mechanism, thereby obtaining the first MAC. As a mathematical expression, the above-described procedure is represented by the following Mathematical Expression 2.

$$mac\_1=Genmac(k\_1,h\|m)$$

Next, the MAC generator 260 delivers the data obtained by coupling the above-mentioned header and the above-mentioned message together, and the second common key to the MAC generation function mechanism, thereby obtaining the second MAC. As a mathematical expression, the above-described procedure can be represented by the following Mathematical Expression 3.

$$mac\_2=Genmac(k\_2,h\|m)$$

The MAC generator 260 couples the above-mentioned header, the above-mentioned message, the above-mentioned first MAC, and the above-mentioned second MAC each other, and generates a message telegram (the following Mathematical Expression 4).

$$m\_out=h\|m\|mac\_1\|mac\_2$$

Note that this format 500 is not only retained by the terminal 200, but also shared by the first server 300 and the second server 400, and is used upon verification.

Note that the MAC generator and the control unit are realized specifically by having a processing unit such as a CPU compute programs which are read in the memory. They may be realized with one CPU, or with separate CPUs.

Figure 3:
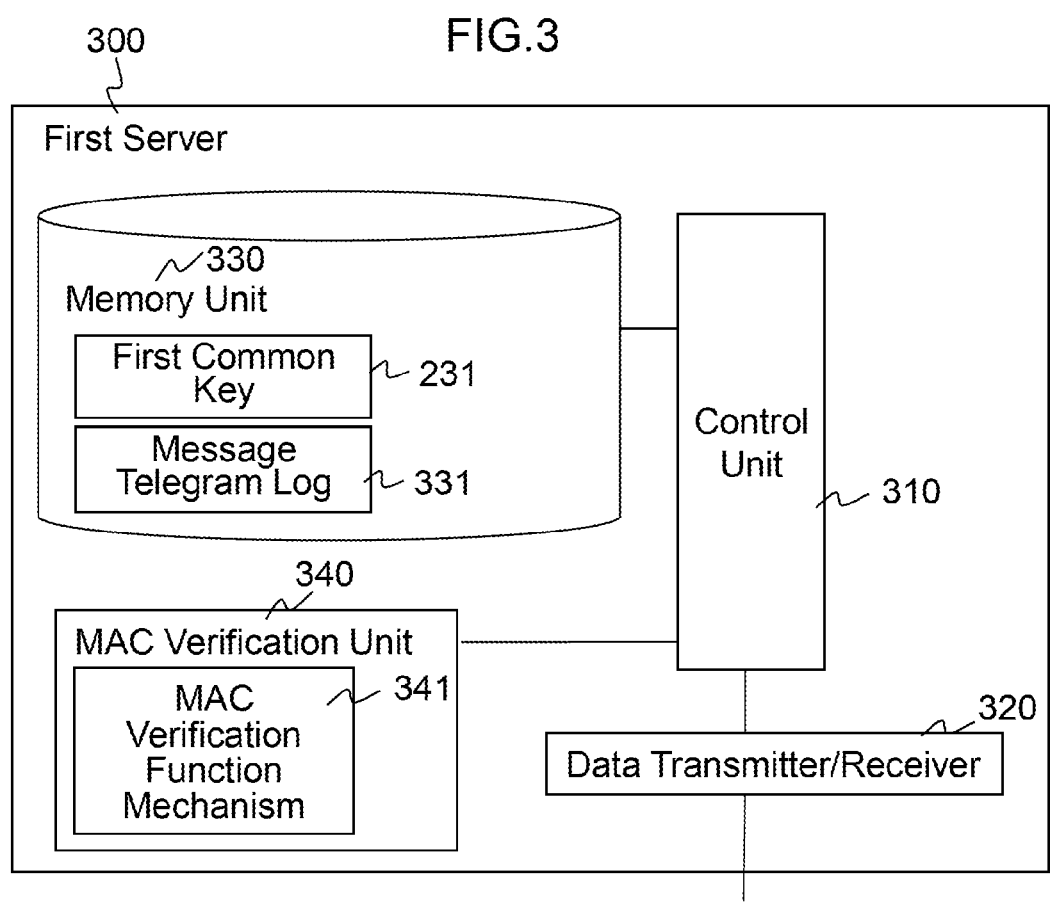
FIG. 3 is a schematic diagram illustrating a first server.

FIG. 3 is a schematic diagram of the first server 300 according to the present embodiment. The first server 300 includes a control unit 310, a data transmitter/receiver 320, a memory unit 330, and a MAC verification function 340. The first server 300 is controlled by the control unit 310, and is linked via the data transmitter/receiver 320 to the first network 100 and the second network 110. The memory unit 330 can store data, and stores the first common key 231 and a message telegram log 331.

The MAC verification unit 340 includes a MAC verification function mechanism 341.

The MAC verification function mechanism 341 is assigned with a verification object message, a common key, and a verification object MAC, and has a function that verifies whether a combination of the verification object message and the verification object MAC is a valid combination or not. The MAC verification function mechanism 341 performs the next operation. Firstly, the MAC verification function mechanism 341 calculates a right MAC from the input verification object message and the input common key by means of a Genmac function. Under this circumstance, the Genmac function is the same function as that used for the MAC function mechanism 261. Next, the MAC verification function mechanism 341 compares the calculated right MAC with the input verification object MAC; and when the calculated right MAC matches the input verification object MAC, the MAC verification function mechanism 341 determines that the verification has been performed successfully, and outputs "1" as a function value; and when the calculated right MAC does not match the input verification object MAC, the MAC verification function mechanism 341 determines that the verification has failed, and outputs "0" as the function value. The MAC verification function is expressed with a pseudo code as below. Note that in this expression, Vermac represents the MAC verification function, m denotes the input verification object message, k denotes the input common key, and mac denotes the input verification object MAC.

function of Vermac(m, k, mac):
mac_tmp←Genmac(k, m)
if (mac_tmp==mac) then
return 1
end if
return 0

Operation of the MAC verification unit 340 will be described. The MAC verification unit 340 receives the message telegram and the first common key from the control unit 310, and verifies the validity of the message telegram. Firstly, the MAC verification unit 340 extracts the header, the message, and the first MAC from the message telegram in accordance with the format 500 of the message telegram. Next, the MAC verification unit delivers the data obtained by coupling the header and the message together as a verification object message, the first common key as the common key, and the first MAC as the verification object MAC to the MAC verification function mechanism 341, thereby obtaining the verification result. The MAC verification unit returns the obtained verification result to the control unit 310.

Note that the MAC verification unit and the control unit are realized specifically by having a processing unit such as a CPU compute program which is read in the memory. They may be realized by one CPU, or separate CPUs.

Under this circumstance, which part of the message telegram 500 is the MAC that relates to the first server is determined in advance; and according to that, the MAC verification unit can take out the first MAC.

Figure 4:
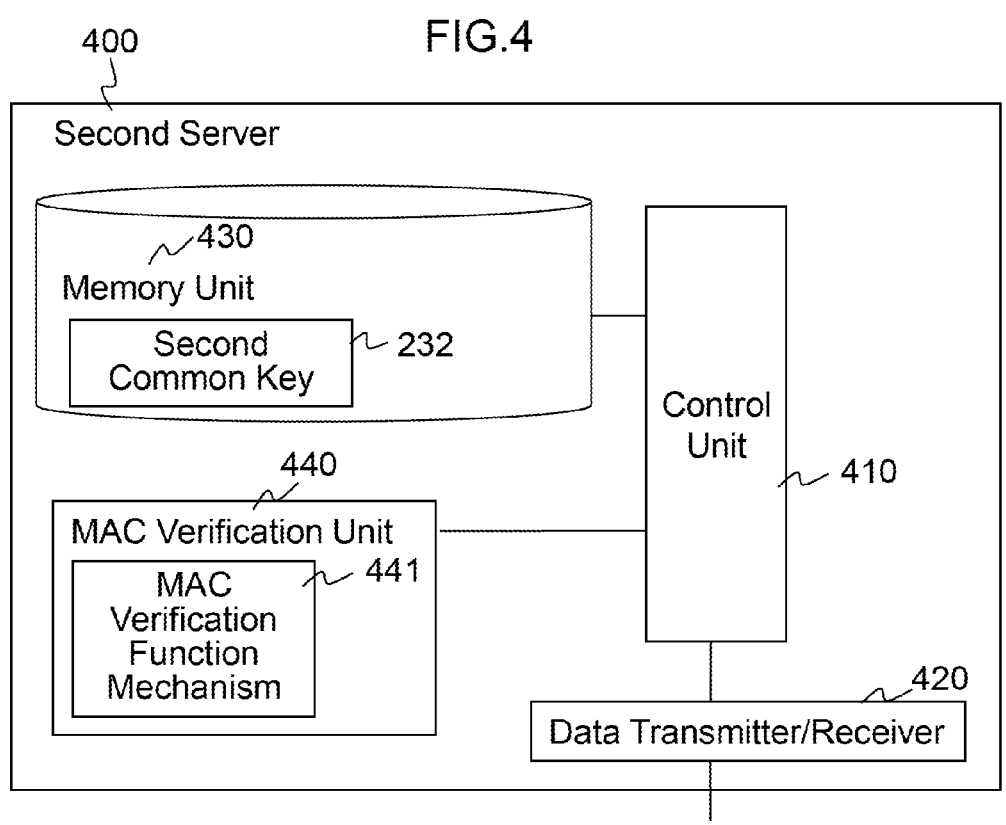
FIG. 4 is a schematic diagram illustrating a second server.

FIG. 4 is a schematic diagram of the second server 400 according to the present embodiment. The second server 400 includes a control unit 410, a data transmitter/receiver 420, a memory unit 430, and an MAC verification function 440.

The memory unit 430 can store data, and stores the second common key 232.

The MAC verification unit 440 is equipped with a MAC verification function mechanism 441.

The MAC verification function mechanism 441 has the same function as that of the above-mentioned MAC verification function mechanism 341.

Operation of the MAC verification unit 440 will be described. The MAC verification unit 440 receives the message telegram and the second common key from the control unit 410, and verifies the validity of the message telegram. Firstly, the MAC verification unit 440 takes out the header, the message, and the second MAC from the message telegram in accordance with the format 500 of the message telegram. Next, the MAC verification unit delivers the data obtained by coupling the header and the message together as a verification object message, the second common key as the common key, and the second MAC as the verification object MAC to the MAC verification function mechanism 441, thereby obtaining the verification result. The MAC verification unit returns the obtained verification result to the control unit 410.

Note that as described in FIG. 3, the MAC verification unit and the control unit are realized specifically by having a processing unit such as a CPU compute program which is read in the memory. They may be realized by one CPU, or separate CPUs.

Which part of the message telegram 500 is the MAC that relates to the first server is determined in advance; and in accordance with this part, the MAC verification unit can extracts the first MAC.

Figure 6:
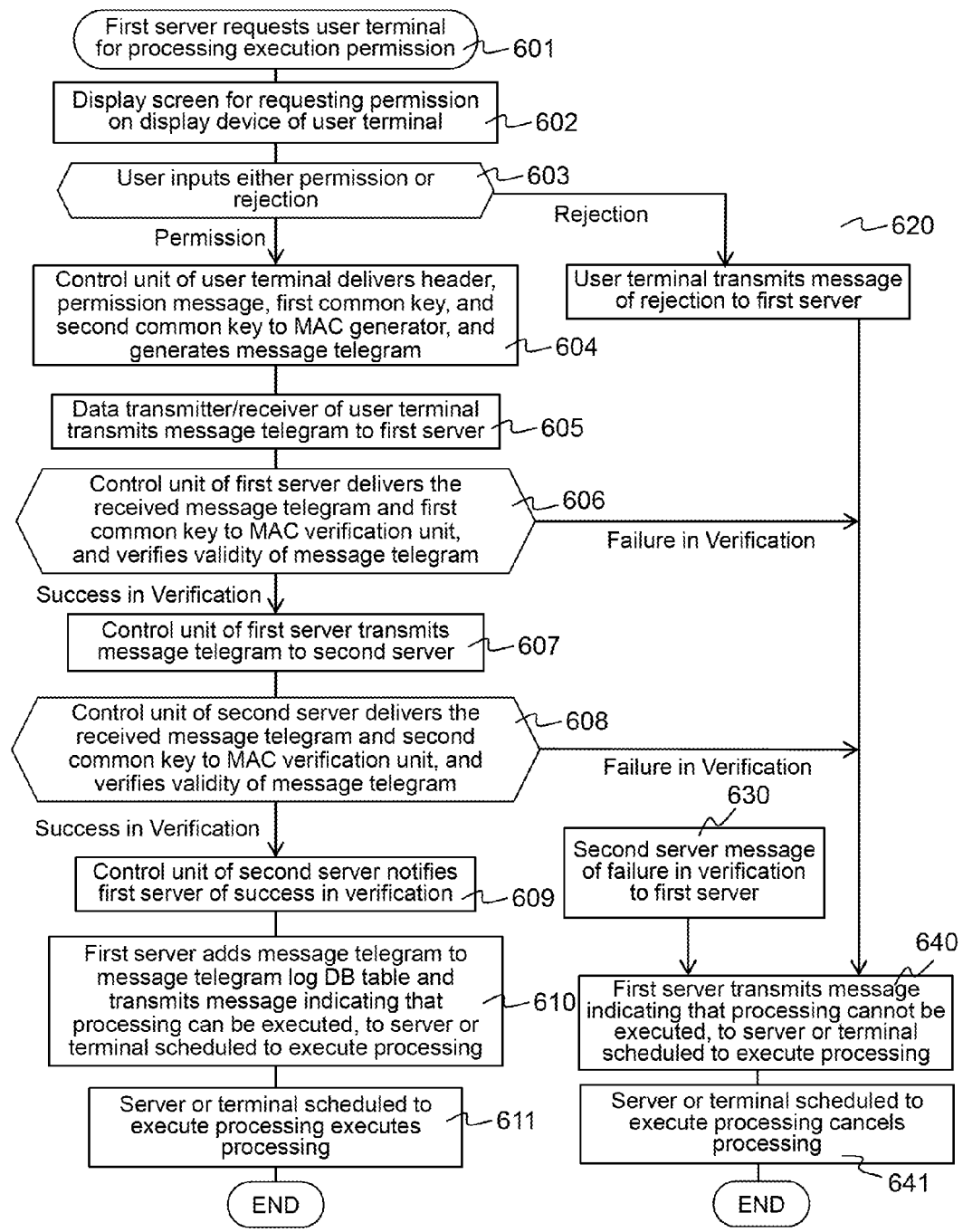
FIG. 6 is a flowchart illustrating a procedure for checking a user permission.

FIG. 6 is a flowchart illustrating a processing sequence for checking the user permission according to the present embodiment.

Firstly, the first server 300 transmits a message to the user terminal 200 to request for a permission to execute processing (Step 601). The control unit 210 of the user terminal 200 receives a permission request telegram via the data transmitter/receiver 220, and outputs a screen with the permission request message written thereon to the display device 240 (Step 602). The user inputs either permission or rejection in response to the permission request by using the input device 250 of the user terminal 200 (Step 603).

When the permission is input in Step 603, the control unit 210 of the user terminal 200 acquires the first common key 231 and the second common key 232 from the memory unit 230, and transmits a message of permission, a header, and the first common key to the MAC generator 260, and the MAC generator generates a message telegram 500 from the message of the permission, the header, the first common key, and the second common key, and returns the message telegram 500 to the control unit (Step 604). The control unit 210 transmits the above-mentioned message telegram via the data transmitter/receiver 220 to the first server 300 (Step 605).

The control unit 310 of the first server receives the above-mentioned message telegram via the data transmitter/receiver 320, acquires the first common key 231 from the memory unit 330, and delivers the message telegram and the first common key to the MAC verification unit 340. The MAC verification unit verifies the validity of the message telegram, and returns the verification result to the control unit (Step 606).

When the verification has successfully been performed in Step 606, the control unit 310 transmits the message telegram via the data transmitter/receiver 320 to the second server 400 (Step 607). The control unit 410 of the second server receives the above-mentioned message telegram via the data transmitter/receiver 420, receives the second common key 232 from the memory unit 430, and delivers the message telegram and the second common key to the MAC verification unit 440. The MAC verification unit verifies the validity of the message telegram and returns the verification result to the control unit 410 (Step 608).

When the verification has successfully been performed in Step 608, the control unit 420 transmits a message of the verification success via the data transmitter/receiver 420 to the first server 300 (Step 609). The control unit 310 of the first server 300 receives the message of the verification success via the data transmitter/receiver 320, adds the above-mentioned message telegram to the message telegram log 331, and transmits a message indicating that the processing can be executed, to the user or the server terminal that will execute the processing for which the user was requested for their permission in Step 601 (Step 610).

The user terminal or the server, which has received the message indicating that the processing can be executed, executes the processing (Step 611).

When the user inputs the rejection in Step 603, the user terminal 200 transmits a message of rejection to the first server (Step 620) and the processing proceeds to Step 640.

When the verification of the validity has failed in Step 606, the processing proceeds to Step 640.

When the verification of the validity has failed in Step 608, the second server 400 transmits a message of the verification failure to the first server (Step 630) and the processing proceeds to Step 640.

In Step 640, the first server 300 transmits a message indicating that the processing is cannot be executed, to the server or the user terminal scheduled to execute the processing for which the user was requested for their permission in Step 601 (Step 640). The user terminal and the server, which has received the message indicating the processing cannot be executed, cancels the processing without executing it (Step 641).

Note that an example of the operation of the system in Step 601 where the above-mentioned first server 300 requests for the user permission can include the operation where the first server 300 transmits an update program of the user terminal 200 to the user terminal 200, and the user terminal 200 updates the program by executing the update program. Another example of the operation of the system can include the operation where the user terminal 200 updates the program by executing an update program received from the first server in advance.

Note that when the user repudiates their permission regarding the operation of the system for which the user gave any permission in the past, the first server, the second server, or the third party can deny the user's repudiation.

Figure 7:
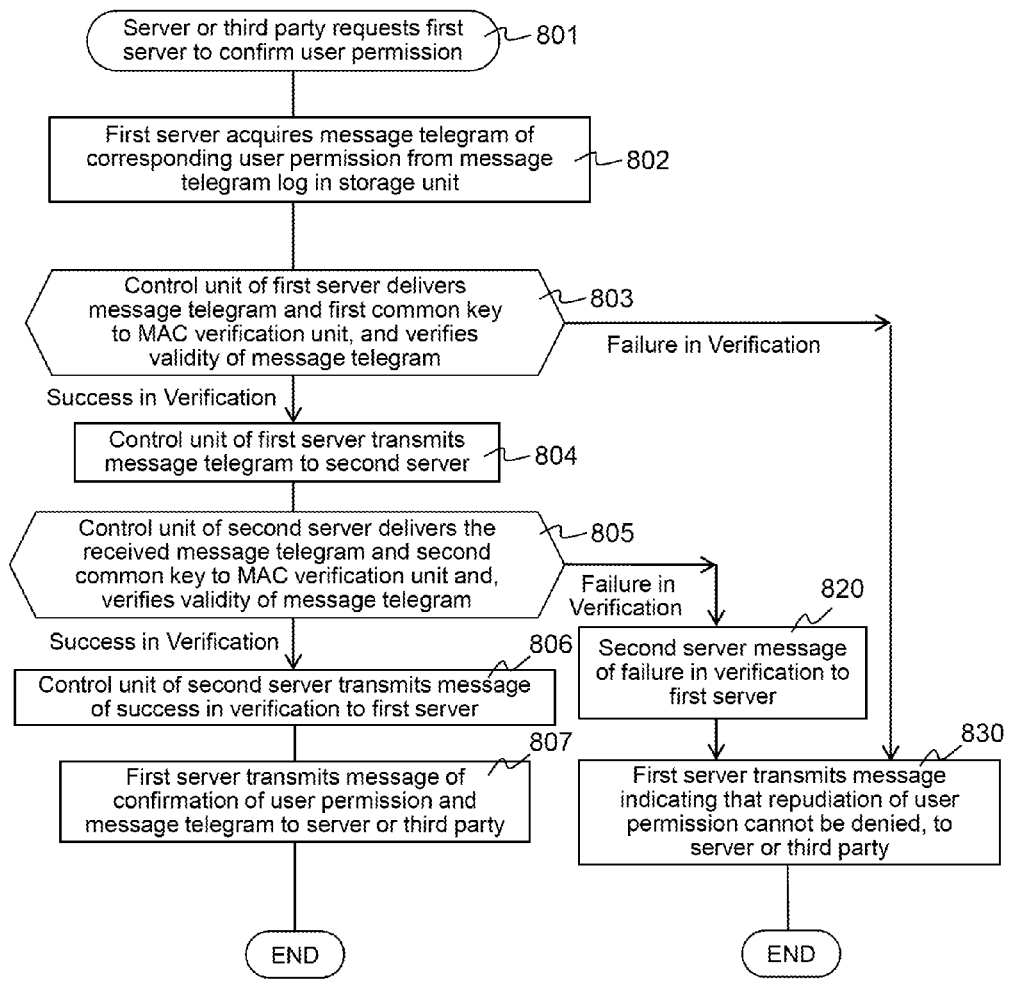
FIG. 7 is a flowchart illustrating a procedure for denying retrospective repudiation of the user permission.

FIG. 7 is a flowchart illustrating a procedure for denying the repudiation.

Firstly, a third party or the server which intends to deny the user's repudiation of permission demands that the first server 300 confirms the user permission (Step 801). The control unit 310 of the first server acquires a message telegram of the relevant user permission from the message telegram log 331 of the storage unit 330 (Step 802). The control unit of the first server delivers the above-mentioned message telegram, the first common key 331, which has been acquired from the storage unit, to the MAC verification unit 340, and the MAC verification unit verifies the validity of the message telegram on the basis of the above-mentioned message telegram and the above-mentioned first common key (Step 803).

When the verification has been performed successfully in Step 803, the control unit transmits the message telegram to the second server (Step 804). The control unit of the second server delivers the above-mentioned message telegram and the second common key, which has been acquired from the storage unit, to the MAC verification unit 340. The MAC verification unit 340 verifies the validity of the message telegram on the basis of the above-mentioned message telegram and the second common key (Step 805).

When the verification has been performed successfully in Step 805, the second server transmits a message of the verification success to the first server (Step 806). The first server transmits a message indicating that the user permission has been confirmed, and the above-mentioned message telegram to the server or the third party in Step 801 (Step 807).

When the verification has failed in Step 803, the processing proceeds to Step 830.

When the verification has failed in Step 805, the second server transmits a message of the verification failure to the first server (Step 820) and the processing proceeds to Step 830.

In Step 830, the first server transmits a message indicating that the repudiation of the user permission cannot be denied, to the server or the third party in Step 801 (Step 830).

Figure 8:
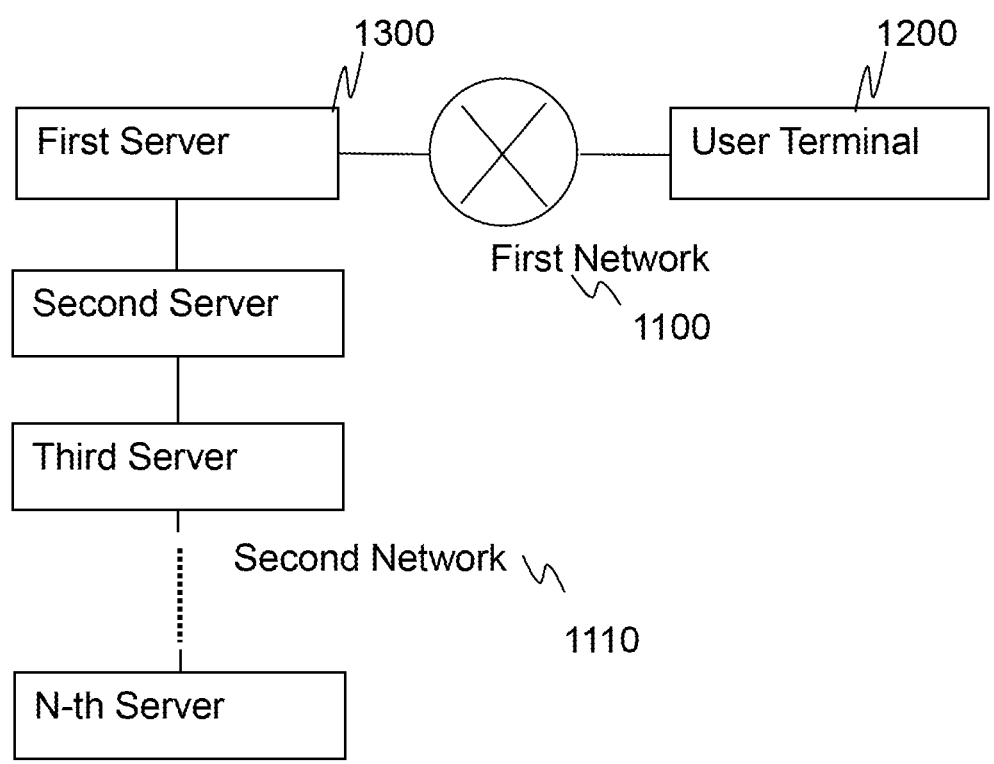
FIG. 8 is a diagram illustrating a system example of the second embodiment according to the present invention.

Note that when the third party can access the message telegram log 331 of the first server 300, the MAC verification unit 340 of the first server 300, and the MAC verification unit 440 of the second server, the third party can execute all the processing steps executed by the first server and the second server with respect to the respective steps of the flowchart in FIG. 8.

Note that the first MAC and the second MAC of the message telegram generated by the user terminal are not limited to those represented by Expressions 2 and 3, and may be an MAC generated by nesting MAC generation by the first common key and MAC generation by the second common key. Under this circumstance, nesting means to make the MAC generated with the second common key a part of the MAC generation input by the first common key or to make the MAC generated with the first common key a part of the MAC generation input by the second common key. For example, mac_12 and mac_21 expressed in the following Mathematical Expressions 6:

$$mac\_12=mac\_2\|Genmac(k\_1,h\|m\|mac\_2)$$

and; the following Mathematical Expression 7:

$$mac\_21=mac\_1\|Genmac(k\_2,h\|m\|mac\_1)$$

may respectively be the first MAC and the second MAC.

When mac_12 and mac_21 are respectively the first MAC and the second MAC, the MAC generator of the user terminal and the MAC verification unit of the server generate and verify the MAC in accordance with Mathematical Expressions 6 and 7, respectively.

Second Embodiment

A second embodiment is an embodiment which has expanded the first embodiment and in which the number of servers is expanded to N including the first server to the N-th server while there are two servers in the first embodiment.

FIG. 8 is an overall configuration diagram of a system according to the second embodiment. A user terminal 1200 and a first server 1300 are linked to each other via a first network 1100, and the N servers such as the first to N-th servers are linked to each other via a second network 1110.

Figure 9:
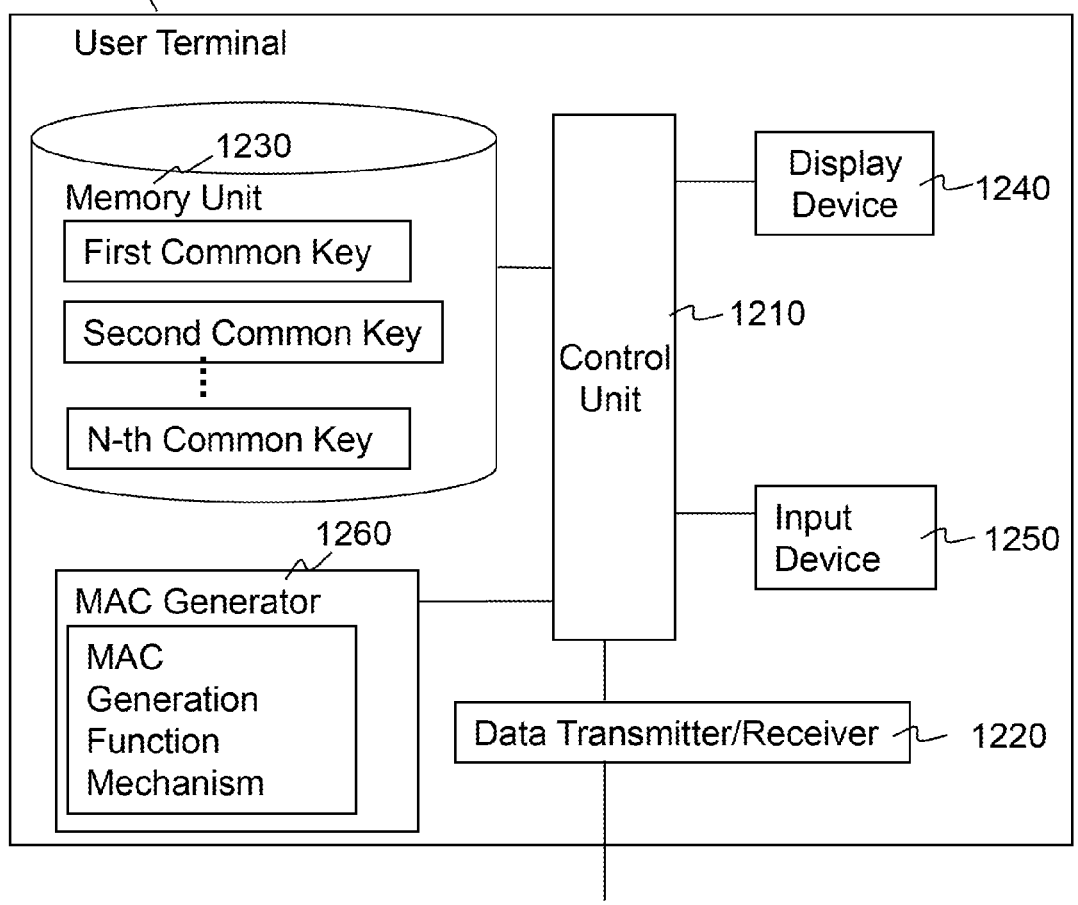
FIG. 9 is a schematic diagram illustrating a user terminal.

FIG. 9 is a schematic diagram of the user terminal 1200. The user terminal has the same configuration as that of the first embodiment, and is composed of a control unit, a data transmitter/receiver, a memory unit, a MAC generator, a display device, and an input device. The memory unit 1230 stores N common keys including first to N-th common keys.

The MAC generator is equipped with the same MAC generation function mechanism 1261 as that of the first embodiment.

The MAC generator receives a message which is an object to add a MAC, a header, N common keys including a first common key to an N-th common key from the control unit and processes them, thereby generates a message telegram 1500 with the MAC added thereto.

Note that an explanation regarding the configuration in common with the explanation regarding FIG. 2 is omitted.

FIG. 10 is a diagram illustrating the format of a message telegram 1500.

A processing sequence of the MAC generator 1260 for generating the message telegram 1500 will be described below. Note that h denotes the above-mentioned header, m denotes the above-mentioned message, k_i denotes an i-th common key, m_out denotes the above-mentioned message telegram, and mac_i denotes an i-th MAC, in the following explanation.

Firstly, the MAC generator generates N pieces of MACs. For example, regarding the i-th MAC, the MAC generator delivers data obtained by coupling the above-mentioned header and the above-mentioned message together, and the i-th common key to the MAC generation function mechanism, thereby obtaining the i-th MAC. Describing with a mathematical expression, the above-described procedure can be represented by the following expression.

$$mac\_i=Genmac(k\_i,h\|m)$$

The MAC generator generates a message telegram by coupling the above-mentioned header, the above-mentioned message, and the N pieces of MACs including a first MAC to an N-th MAC.

$$mout=h\|m\|mac\_1\|mac\_2\|\ldots\|mac\_N$$

The first server has the same configuration as that of the first server 300 according to the first embodiment, and is composed of a control unit, a data transmitter/receiver, a memory unit, and a MAC verification unit. The memory unit stores a first common key.

Each server from second to N-th servers has the same configuration as that of the second server 400 according to the first embodiment, and is composed of a control unit, a data transmitter/receiver, a memory unit, and an MAC verification unit. A common key stored in the memory unit varies depending on each server and a k-th common key is stored in a k-th server.

The MAC verification unit of each server from the first server to the N-th server is equipped with a MAC verification function mechanism 341 which is similar to that of the first embodiment.

The MAC verification unit of an i-th server receives a message telegram and an i-th common key from the control unit and verifies the validity of the message telegram. Firstly, the MAC verification unit takes out the header, the message, and an i-th MAC from the message telegram in accordance with the format 1500 of the message telegram. Next, the MAC verification unit delivers the data obtained by coupling the header and the message together as a verification object message, the i-th common key as a common key, and the i-th MAC as a verification object MAC to the MAC verification function mechanism, thereby obtaining the verification result. Then, the MAC verification unit returns the obtained verification result to the control unit.

Figure 11:
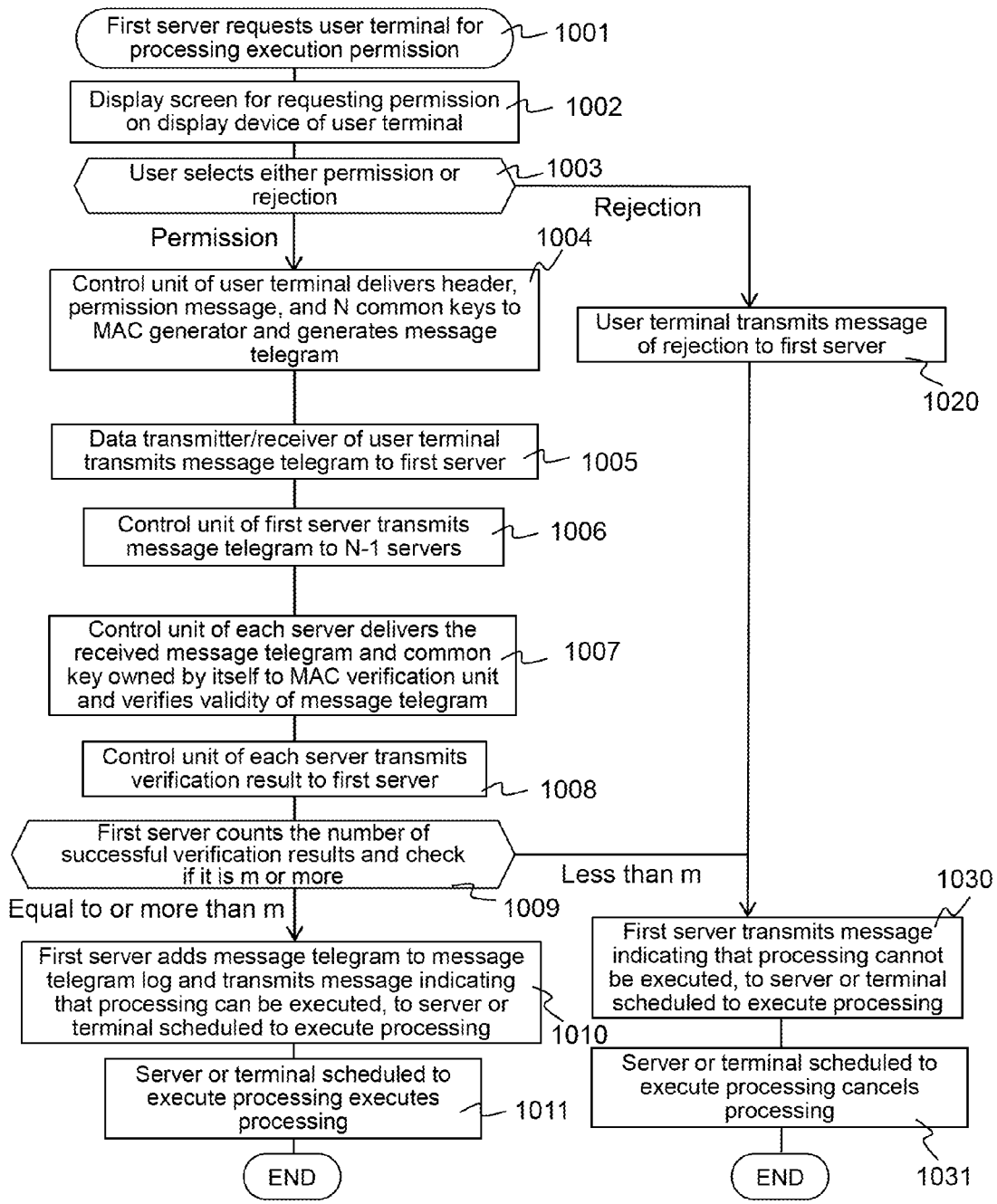
FIG. 11 is a flowchart illustrating a procedure for checking the user permission.

FIG. 11 is a flowchart illustrating a processing execution checking procedure according to the second embodiment. Incidentally, m in Steps represents an integer larger than N/2 and equal to or less than N.

Firstly, the first server 130 transmits a message to the user terminal 1200 to request for permission to execute processing (Step 1001). The data transmitter/receiver 1220 of the user terminal 1200 receives a permission request telegram, and outputs a screen with the permission request message written thereon to the display device 1240 (Step 1002). The user inputs either permission or rejection in response to the permission request by using the input device 1250 of the user terminal 1200 (Step 1003).

When the permission is input in Step 1003, the control unit 1210 of the user terminal 1200 acquires N common keys, including first to N-th common keys, from the memory unit 1230, and delivers a message of permission, a header, and the N common keys to the MAC generator 1260, and the MAC generator generates a message telegram 1500, and returns the message telegram to the control unit (Step 1004). The control unit 1210 transmits the message telegram via the data transmitter/receiver 1220 to the first server 1300 (Step 1005).

The data transmitter/receiver of the first server receives the above-mentioned message telegram, and transmits the message telegram via the data transmitter/receiver to N-1 servers including the second server to the N-th server (Step 1006).

Regarding each i-th server which has acquired the message telegram, the control unit of the server acquires the i-th common key from the memory unit, and delivers the message telegram and the i-th common key to the MAC verification unit of the server, and the MAC verification unit verifies the validity of the message telegram, and returns the verification result to the control unit (Step 1007). The control unit of each i-th server transmits the above-mentioned verification result to the first server (Step 1008). The first server counts the number of verification successes from among the gathered N pieces of verification results, and checks if the number of successes is m or more (Step 1009).

When the number of verification successes is m or more in Step 1009, the control unit of the first server 1300 adds the above-mentioned message telegram to the message telegram log of the storage unit, and transmits a message indicating that the processing can be executed, via the data transmitter/receiver to the user terminal or the server that will execute the processing for which the user was requested for their permission in Step 1001 (Step 1010). The user terminal or the server, which has received the message of the processing execution, executes the processing (Step 1011).

When the user inputs the rejection in Step 1003, the user terminal 1200 transmits a message of rejection to the first server (Step 1020), and the processing proceeds to Step 1030.

When the number of verification successes is less than m in Step 1008, the processing proceeds to Step 1030.

In Step 1030, the first server 1300 transmits a message indicating that the processing cannot be executed, to the server or the user terminal scheduled to execute the processing for which the user was requested for their permission in Step 1001 (Step 1030). The user terminal or the server, which has received the message indicating the processing cannot be executed, cancels the processing without executing it (Step 1031).

Figure 12:
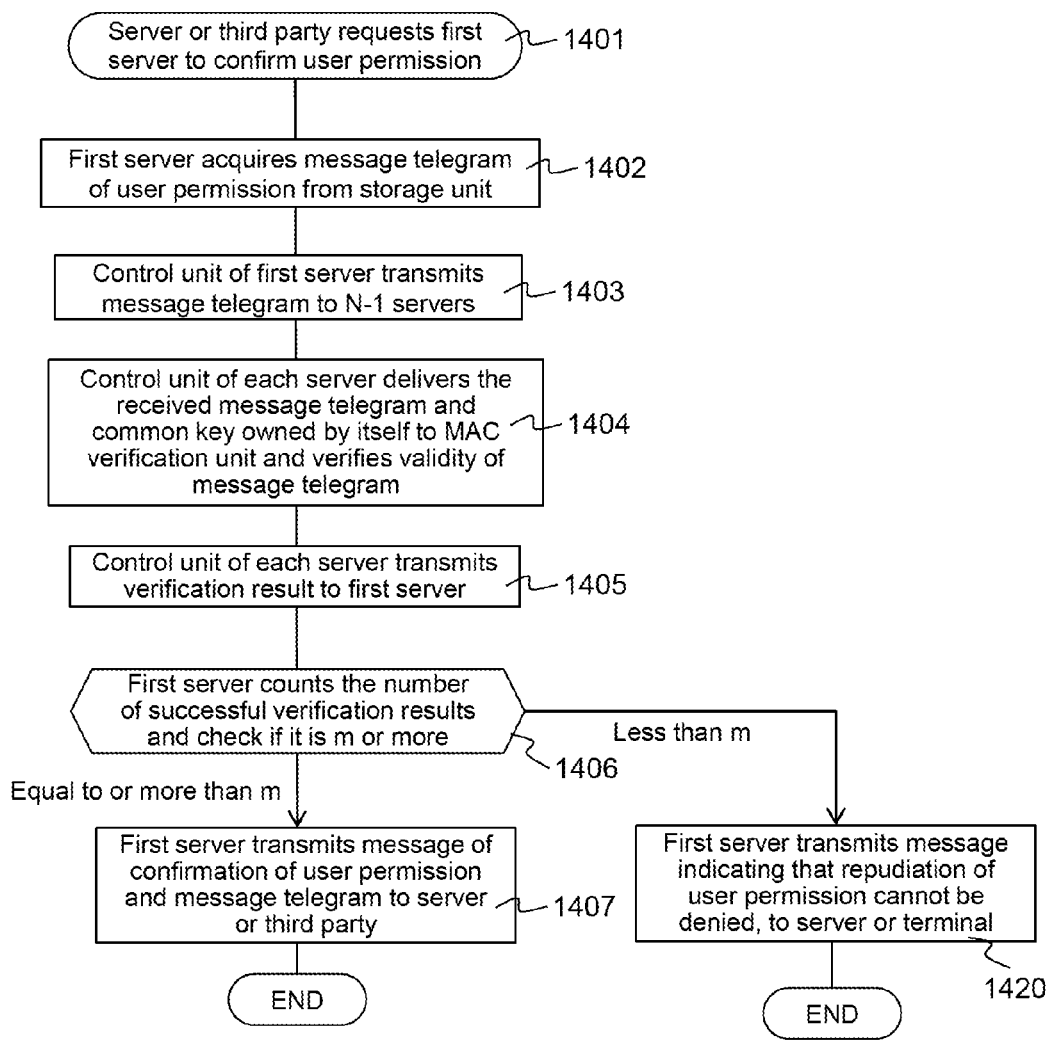
FIG. 12 is a flowchart illustrating a procedure for denying the retrospective repudiation of the user permission.

Note that when the user repudiates their permission regarding the operation of the system for which the user gave the permission in the past, the server or the third party can deny the repudiation. FIG. 12 is a flowchart illustrating a procedure for denying the repudiation.

Firstly, the third party or the server which intends to deny the user's repudiation of permission demands that the first server confirm the user permission (Step 1401). The control unit of the first server acquires a message telegram of the relevant user permission from the message telegram log of the storage unit (Step 1402). The control unit of the first server transmits the above-mentioned message telegram to N-1 servers including the second server to the N-th server (Step 1403). The control unit of the first server transmits the above-mentioned message telegram to the N-1 servers including the second server to the N-th server (Step 1403). The control unit of each server delivers the above-mentioned message telegram and the common key, which it has acquired from the storage unit and retains, to the MAC verification unit and the MAC verification unit verifies the validity of the message telegram on the basis of the above-mentioned message telegram and the common key (Step 1404). Each server transmits the verification result to the first server (Step 1405). The first server counts the number of verification successes from among the gathered N pieces of verification results and checks if the number of successes is m or more (Step 1406).

When the number of verification successes is m or more in Step 1406, the first server 1300 transmits a message indicating that the user permission has been confirmed, and the above-mentioned message telegram to the server or the third party in Step 1401 (Step 1407).

When the number of verification successes is less than m in Step 1406, the first server transmits a message indicating that the repudiation of the user permission cannot be denied, to the server or the third party in Step 1401 (Step 1420).

Note that when the third party can access the message telegram log of the first server 1300 and all the MAC verification units of the first server to the N-th server, the third party can execute all the processing Steps executed by the first server to the N-th server with respect to the respective steps of the flowchart in FIG. 12.

Note that the i-th MAC of the message telegram generated by the MAC generator 1260 of the user terminal 1200 in the second embodiment is not limited to that expressed by Expression 6. For example, the i-th MAC may be mac_i expressed in the following expression.

$$mac\_i'=othermac\_i \| Genmac(k\_i,h\|m\|othermac\_i)$$

In the above expression, othermac_i denotes an arbitrary value, other than k_i, which can be calculated by using the N-1 common keys, the header h, the message m, and the Genmac function.

REFERENCE SIGNS LIST

100: first network
110: second network
200: user terminal

210: control unit
220: data transmitter/receiver
230: memory unit
231: first common key
232: second common key
240: display device
250: input device
260: MAC generator
261: MAC generation function mechanism
300: first server
310: control unit
320: data transmitter/receiver
330: memory unit
331: message telegram log
340: MAC verification unit
341: MAC verification function mechanism
400: second server
410: control unit
420: data transmitter/receiver
430: memory unit
440: MAC verification unit
441: MAC verification function mechanism
500: message telegram
510: header
520: message
530: first MAC
540: second MAC
1100: first network
1110: second network
1200: user terminal
1210: control unit
1220: data transmitter/receiver
1230: memory unit
1240: display device
1250: input device
1260: MAC generator
1261: MAC generation function mechanism
1300: first server
1500: message telegram

The invention claimed is:

1. A check system for checking permissions of a user that requires less processing resources and has a property of non-repudiation, the system comprising:
a first server;
a second server; and
a terminal that is communicatively coupled to the first server via a first network, wherein the first server and the second server are communicatively coupled via-a second network;
wherein the terminal includes:
a terminal memory that stores a first common key and a second common key, and
a terminal processor communicatively coupled to the memory, wherein the processor computes a first MAC value of a message regarding the processing of the terminal by the user based on the first common key, computes a second MAC value of the message based on the second common key to form a first file containing the message and two MAC values, and transmits the first file to the first server;
wherein a first processor of the first server:
receives the first file from the terminal,
verifies the message and the first MAC value contained in the first file utilizing the first common key,
forms a second file containing the message and the second MAC value, and
on a condition that the first file is verified, transmits the second file to the second server;
wherein a second processor of the second server:
receives the second file from the first server,
verifies the message and the second MAC value of the second file utilizing the second common key, and
on a condition that the second file is verified, transmits a verification result to the first server.

2. The check system according to claim 1,
wherein the first server verifies whether the first MAC generated by the terminal with the first common key matches a third MAC generated with the first common key which the first server has; and
wherein the second server verifies whether the second MAC generated by the terminal with the second common key matches a fourth MAC generated with the second common key which the second server has.

3. The check system according to claim 2,
wherein the MAC generator of the terminal processor generates the first MAC and the second MAC with MAC generation by the first common key and MAC generation by the second common key nested each other.

4. The check system according to claim 3,
wherein execution by the user is permitted only when the first MAC matches the third MAC and the second MAC matches the fourth MAC.

5. The check system according to claim 4,
wherein the execution by the user is to update the terminal with update data.

6. The check system according to claim 2,
wherein the first server and the second server are among a quantity of N servers;
wherein the terminal processor generates N pieces of MACs including the first MAC to an N-th MAC by using N common keys including the first common key to an N-th common key; and
wherein one k-th server existing for each k which assumes a value of 2 to N−1 generates an (N+k)th MAC using a k-th common key, and verifies whether the (N+k)th MAC matches a k-th MAC of the file.

7. The check system according to claim 6,
wherein execution by the user is permitted when the k-th MAC matches the (N+k)th MAC with respect to k whose quantity is more than m, assuming that k is 1 to N.

8. A check method for checking permissions of a user that requires less processing resources and has a property of non-repudiation the check method comprising:
computing, by a terminal, a first MAC value and a second MAC value of a message regarding processing of the terminal by the user with a first common key and a second common key, respectively, to form a first file;
transmitting, by the terminal, the first file to a first server;
verifying, by the first server, the message and the first MAC value contained in the file received from the terminal with the first common key;
forming, by the first server, a second file consisting of the message and the second MAC value;
on a condition that the first file is verified, transmitting, by the first server, the second file to a second server;
verifying, by the second server, the message and the second MAC value contained in the second file received from the first server, with the second common key;

on a condition that the second file is verified, transmitting, by the second server, a verification result to the first server; and storing, by the first server, the verification result received from the second server in a memory unit.

* * * * *